US008922769B2

(12) United States Patent
Smith

(10) Patent No.: US 8,922,769 B2
(45) Date of Patent: Dec. 30, 2014

(54) HIGH RESOLUTION MEMS-BASED HADAMARD SPECTROSCOPY

(71) Applicant: Malcolm C. Smith, Winchester, MA (US)

(72) Inventor: Malcolm C. Smith, Winchester, MA (US)

(73) Assignee: Thermo Scientific Portable Analytical Instruments Inc., Tewksbury, MA (US)

( * ) Notice: Subject to any disclaimer, the term of this patent is extended or adjusted under 35 U.S.C. 154(b) by 0 days.

(21) Appl. No.: 13/796,747

(22) Filed: Mar. 12, 2013

(65) Prior Publication Data

US 2014/0268139 A1 Sep. 18, 2014

(51) Int. Cl.
*G01J 3/28* (2006.01)
*G01J 3/18* (2006.01)

(52) U.S. Cl.
CPC . *G01J 3/1809* (2013.01); *G01J 3/28* (2013.01)
USPC .......................................................... 356/328

(58) Field of Classification Search
USPC ................... 356/300, 326, 328, 334
See application file for complete search history.

(56) References Cited

U.S. PATENT DOCUMENTS

| 4,615,619 | A | 10/1986 | Fateley |
| 4,799,795 | A | 1/1989 | Fateley |
| 4,856,897 | A | 8/1989 | Fateley |
| 5,483,335 | A | 1/1996 | Tobias |
| 5,485,268 | A | 1/1996 | Tobias |
| 6,046,808 | A | 4/2000 | Fateley |
| 6,128,078 | A | 10/2000 | Fateley |
| 6,271,917 | B1 | 8/2001 | Hagler |
| 6,392,748 | B1 | 5/2002 | Fateley |
| 6,753,960 | B1* | 6/2004 | Polynkin et al. .............. 356/330 |
| 6,996,292 | B1 | 2/2006 | Gentry |
| 7,262,846 | B2 | 8/2007 | Hagler |
| 2008/0174777 | A1* | 7/2008 | Carron .......................... 356/328 |

FOREIGN PATENT DOCUMENTS

JP 2001 264169 A 9/2001

OTHER PUBLICATIONS

Deverse et al., "Realization of the Hadamard Multiplex Advantage Using a Programmable Optical Mask in a Dispersive Flat-Field Near-Infrared Spectrometer," Applied Spectroscopy, vol. 54, No. 12, 2000, pp. 1751-1758.
Mende et al., "Hadamard Spectroscopy with a Two-Dimensional Detecting Array," Applied Optics, vol. 32, No. 34, 1993, pp. 7095-7105.
Tilotta et al., "A Visible Near-Infrared Hadamard Transform Spectrometer Based on a Liquid Crystal Spatial Light Modulator Array: A New Approach in Spectrometry;" Applied Spectroscopy, vol. 41, No. 5, 1987, pp. 727-734.

(Continued)

*Primary Examiner* — Abdullahi Nur
(74) *Attorney, Agent, or Firm* — Ion C. Abraham

(57) ABSTRACT

A spectrometer includes: a collimating element configured for collimating a beam of light into a first one of a cross-dispersing element and an echelle grating, the grating in optical communication with the cross-dispersing element; a focusing element for receiving the light from a second one of the cross-dispersing element and the echelle grating and focusing wavelengths of the light onto a spatial light modulator; the spatial light modulator configured for selectively directing the wavelengths onto a detector for detection. A method of use and the method of fabrication are provided.

27 Claims, 2 Drawing Sheets

(56) References Cited

OTHER PUBLICATIONS

Tilotta et al., "Hadamard Transform Visible Raman Spectrometry," Applied Spectroscopy, vol. 41, No. 8, 1987, pp. 1280-1287.

Tilotta et al., "Design and Performance of a Hadamard Transform Infrared Spectrometer with No Moving Parts," Applied Spectroscopy, vol. 49, No. 9, 1995, pp. 1338-1348.

Treado et al., "A Thousand Points of Light: The Hadamard Transform in Chemical Analysis and Instrumentation," Anal. Chem., vol. 61, No. 11, 1989, pp. 723A-734A.

Treado et al., "Multichannel Hadamard Transform Raman Microscopy," Applied Spectroscopy, vol. 44, No. 1, 1990, pp. 1-4.

International Search Report, PCT/US2014/024111, dated May 30, 2014, pp. 3.

English Abstract of JP2001-264169A, pp. 1.

* cited by examiner

HIGH RESOLUTION MEMS-BASED HADAMARD SPECTROSCOPY

BACKGROUND OF THE INVENTION

1. Field of the Invention

The invention disclosed herein relates to a handheld spectrometer that exhibits beneficial aspects of MEMS based Hadamard spectrometers while improving the wavelength resolution and extending the wavelength range beyond one octave.

2. Description of the Related Art

Current diffractive MEMS based Hadamard spectrometers have advantages over traditional scanning grating spectrometers. One example is provided in U.S. Pat. No. 7,791,027, entitled "Apparatus and Method Providing a Hand-Held Spectrometer." This patent discloses an IR spectrometer that includes a light source adapted to illuminate a sample, a grating adapted to spectrally disperse a light that has illuminated the sample, a MEMS array adapted to be electrostatically actuated by a controller to control a diffraction of the light, a detector configured to detect the light, and a power source adapted to supply power to the light source and to the MEMS array, wherein the controller is adapted to control the MEMS array so as to manage a power consumption of the IR spectrometer. In one embodiment, the IR spectrometer includes a housing sized and arranged to house the light source, the grating, the MEMS array, the controller, the detector, to and the power source in a hand-held device.

Spectrometers of this kind exhibit improved signal-to-noise benefit from using the Hadamard technique, use of a single element detector, and excellent shock-resistance. However, these spectrometers have limited resolution and wavelength range, making it desirable to have different models when the wavelength range or resolution requirements change. Generally, wavelength resolution is based on the capability of the MEMS chip. The wavelength range is limited by the use of a single order diffraction grating to one octave, meaning that the ratio of the longest wavelength to the shortest wavelength is less than or equal to two.

Thus, what are needed are methods and apparatus to provide a handheld spectrometer that exhibits the beneficial aspects of MEMS based Hadamard spectrometers while improving the wavelength resolution and extending the wavelength range beyond one octave.

SUMMARY OF THE INVENTION

In one embodiment, a spectrometer is disclosed. The spectrometer includes: a collimating element configured for collimating a beam of light into a first one of a cross-dispersing element and an echelle grating in optical communication with the cross-dispersing element; a focusing element for receiving the light from a second one of the cross-dispersing element and the echelle grating and focusing wavelengths of the light onto a spatial light modulator; the spatial light modulator configured for selectively directing the wavelengths onto a detector for detection.

In another embodiment, a method for performing spectral analysis of the sample is disclosed. The method includes: selecting a spectrometer that comprises a collimating element configured for collimating a beam of light into a first one of a cross-dispersing element and an echelle grating in optical communication with the cross-dispersing element; a focusing element for receiving the light from a second one of the cross-dispersing element and the echelle grating and focusing wavelengths of the light onto a spatial light modulator; the spatial light modulator configured for selectively directing the wavelengths onto a detector for detection; detecting light from a sample with the spectrometer; and analyzing the light to provide the spectral analysis.

In another embodiment, a method for fabricating a spectrometer is disclosed. The method includes: configuring a collimating element to collimate a beam of light into a first one of a cross-dispersing element and an echelle grating in optical communication with the cross dispersing element; configuring a focusing element to focus wavelengths of light from a second one of the cross-dispersing element and the echelle grating onto a spatial light modulator, the spatial light modulator directing the wavelengths onto a detector for detection; and arranging the detector to receive the wavelengths.

BRIEF DESCRIPTION OF THE DRAWINGS

The features and advantages of the invention are apparent from the following description taken in conjunction with the accompanying drawings in which.

DETAILED DESCRIPTION OF THE INVENTION

Disclosed herein are methods and apparatus for performing spectroscopy with a hand-held spectrometer. A hand-held spectrometer according to the teachings herein exhibits excellent wavelength resolution beyond the range of one octave. The techniques disclosed herein incorporate use of commercially available MEMS chips, a DLP mirror array, and an echelle grating. The technology disclosed herein may also be used in fixed (for example, laboratory type) spectroscopy systems. Aspects of an exemplary embodiment are provided in FIG. 1.

First, and in order to provide some context, reference may be had to U.S. Pat. No. 7,791,027, entitled "Apparatus and Method Providing a Hand-Held Spectrometer," the disclosure of which is incorporated by reference herein in its entirety, except in so far as anything conflicts with the present disclosure, subject matter of the present disclosure shall prevail over subject matter contained in the reference.

Figure 1:
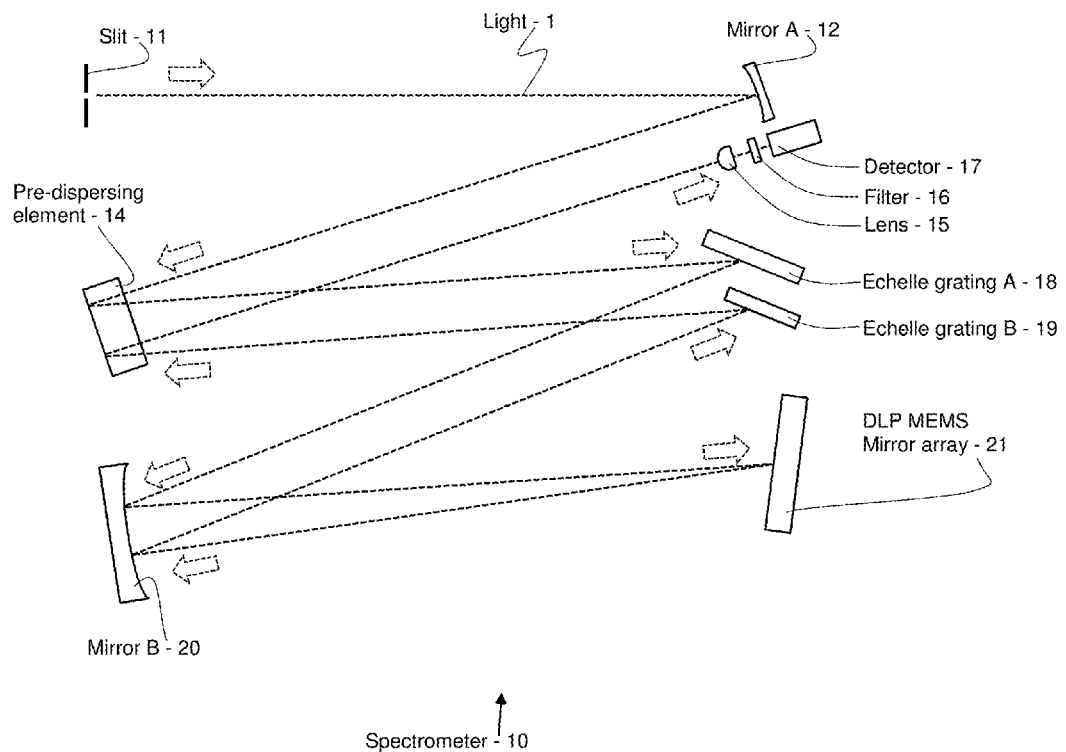
FIG. 1 is an schematic diagram depicting components of a spectrometer according to the teachings herein.

Referring now to FIG. 1, aspects of an exemplary embodiment of a spectrometer are illustrated. In this example, the spectrometer 10 includes an entrance slit 11 through which light 1 travels. The light 1 that penetrates the slit 11 is generated by illumination of a sample (not shown). The sample may be any type of sample for which spectrographic analysis is desired. In some embodiments, the spectrometer 10 includes sources of illumination (i.e., at least one lamp) for illumination of the sample.

The light 1 that has entered the spectrometer through the slit 11 is directed to a first mirror 12 (Mirror A) and is collimated by the first mirror 12. The collimated light 1 is cross-dispersed by a low dispersion grating or prism or combination of both or other similar device, shown here as cross-dispersing element 14. Cross-dispersed light 1 is directed to a first echelle grating, shown here as echelle grating A 18. The light 1 is then focused on a MEMS mirror array 21 by a second mirror 20 (Minor B). The MEMS mirror array 21 acts to keep some portions of the light 1 and to remove other portions of the light 1 from the system in accordance with the Hadamard algorithm. In one embodiment, mirror array 21 will generally have one tilting mirror per pixel, where each mirror can be independently actuated to one of two positions. 21 is configured such that for one position of any pixel mirror the light 1 is reflected in a direction so as to be transmitted in the system, whereas for the second position of each tilting mirror, the light is reflected out of the system, or blocked. Light 1 transmitted by the MEMS mirror array 21 is then focused using at least one of second mirror 20 (Mirror B) and an additional mirror (not shown). The light 1 then travels in reverse direction through the system, being re-focused by second mirror 20 and traveling to at least one of the first echelle grating 18 (grating A), and a second echelle grating 19 (grating B) and at least one of the cross-dispersing element 14 and an additional cross-dispersing element (not shown). This combines the light 1 into a single beam that contains all the wavelengths. The light 1 is then focused onto a single element detector 17 by, for example, use of lens 15 and filter 16. Advantageously and distinct from a single order grating, the echelle gratings 18, 19 function in many orders simultaneously, thus overcoming the one octave wavelength range limitation inherent in the prior art.

It should be noted that in the foregoing embodiment, the first mirror 12 may be broadly referred to as a "collimating element." That is, in this context, the collimating element may include any optical apparatus for appropriately collimating the light 1. Non-limiting examples of collimating elements include a lens, a Fresnel lens, a mirror, a diffractive element and other such components or combinations of components known to provide for collimation.

Likewise, it should be noted that in the foregoing embodiment, the second mirror 20 may be broadly referred to as a "focusing element." That is, in this context, the focusing element may include any optical apparatus for appropriately focusing the light 1. Non-limiting examples of focusing elements include a lens, the mirror and other such components or combinations of components known to provide for focusing.

Likewise, it should also be noted that in the foregoing embodiment, the MEMS mirror array 21 may be broadly referred to as a "spatial light modulator." That is, in this context, the spatial light modulator may include any optical apparatus for appropriately modulating the light 1. In general, this provides for modulating intensity of the light 1 in a two dimensional array of pixels. In that regard, the MEMS mirror array 21 may also be referred to as a "pixelated intensity modulator." Non-limiting examples of the spatial light modulator include an LCD panel, the MEMS mirror array and other such components or combinations of components known to provide for pixelated intensity modulation.

Further, it should be noted that the cross-dispersing element and the focusing element may be provided in a reverse order from what is illustrated. In some embodiments, the spatial light modulator is configured to direct the wavelengths to the detector by a travel path back through at least one of the echelle grating in the focusing element.

The wavelength range and resolution of the spectrometer 10 according to the teachings herein are substantially improved over the prior art. For example, prior art Hadamard spectroscopy devices offer a range of about 1600 nm to about 2400 nm wavelength range with a pixel resolution of 8 nm. In contrast, the spectrometer 10 according to the teachings herein offers a detection range of about 900 nm to about 2500 nm, with a pixel resolution of 0.5 nm. The spectrometer 10 may be operated over a wide sensitivity range, such as an entire range for a detector based on InGaAs.

In a Hadamard spectrometer, the signal-to-noise ratio (SNR) advantage is proportional to the square root of half the number of wavelength pixels. A traditional scanning grating spectrometer collects one wavelength pixel of data at a time. In a prior art embodiment of a Hadamard spectrometer, such as is disclosed in the prior art reference incorporated herein, there are 100 pixels, so the advantage is about a factor of seven. However, for embodiments of the spectrometer 10 according to the teachings herein, the signal-to-noise ratio may be dramatically improved. For example, SNR improvement may be calculated by considering that the number of wavelength pixels is approximately the number of echelle diffraction orders multiplied by the number of mirror pixels in one row. Accordingly, in some embodiments, this is about 80 orders and 400 pixels, leading to a SNR improvement of about 125.

It should be noted that if the fine 0.5 nm resolution is not required for an application, the slit 11 may be opened up, thus getting more light 1 into the spectrometer 10 and the improving the SNR. The range can be extended still further by using a second detector, such as a silicon detector to extend the range all the way through visible wavelengths, or an HgCdTe detector to extend the range into the mid-infrared. To accommodate two or more detectors, the filter 16 may be used just before the detector(s) 17 to direct the appropriate wavelengths to each respective detector. That is, the filter 16 may selectively pass or reflect a particular group of wavelengths.

In some embodiments, the spectrometer 10 includes adjustable mechanisms. For example, the spectrometer 10 may include an adjustable slit 11, such as one that may be adjusted electronically (e.g., electromechanically) through manipulation of a user interface. In this manner, aspects such as resolution, signal-to-noise ratios and other such performance criteria may be modified by a user.

Advantageously, the spectrometer 10 may be fabricated using commercially available components. For example, suitable embodiments of the MEMS (that is, a "microelectromechanical system") mirror array 21 may be obtained from Texas Instruments of Dallas, Tex. Exemplary components are provided in the product line of DLP chipsets. In addition, embodiments of the echelle gratings 18, 19 may be obtained from Newport Richardson Gratings of Rochester N.Y.

In some embodiments, the spectrometer 10 includes additional components for spectral analysis. For example, the detector 17 may be in communication with a processor that provides for spectral analysis. The processor may process software for analyzing wavelengths received by the detector. The wavelengths may be associated with, for example, data stored in memory. The data stored in memory may associate the wavelengths with particular properties are aspects of the sample. For example the wavelengths may indicate presence of at least one compound or composition of matter.

Thus, other components may be included in the spectrometer 10. Exemplary components include at least one of each of the following: a data interface, a user interface, a power supply, a source of illumination (e.g., a lamp), a power management controller, a logic controller, as well as other components such as a processor, memory, energy storage (such as a battery) and software (i.e., computer executable instructions stored on machine readable media). The foregoing components and others as may be deemed appropriate for use in the spectrometer 10 may be included and may use commonly available components.

Advantageously, the spectrometer 10 disclosed herein may be provided in a compact package. More specifically, the spectrometer 10 may be configured as a "hand-held" instrument. Implementations of the spectrometer 10 as a hand-held instrument include embodiments that have at least one light source. However, it should be noted that the spectrometer 10 is not limited to implementations as a hand-held instrument. For example, the teachings herein may be applied to other forms of spectrometers, such as for laboratory equipment, fixed equipment (such as process oriented equipment) and the like.

Figure 2:
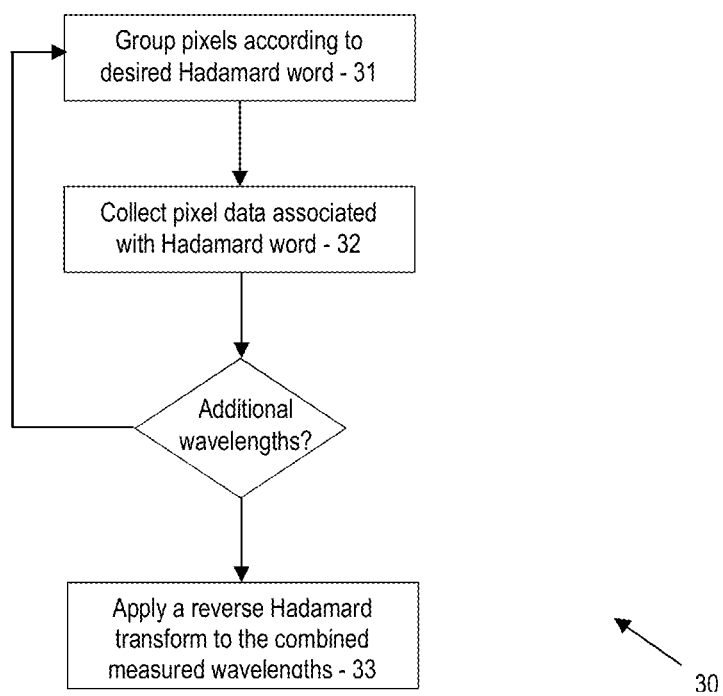
FIG. 2 is a flow chart providing an exemplary process for sample analysis using the spectrometer disclosed herein.

Refer now to FIG. 2 which is a flow chart illustrating an exemplary embodiment for sampling 30. In this embodiment, dispersed wavelengths are collected using Hadamard encoding. The mirror pixels within the MEMS mirror array 21 generate data according to a Hadamard matrix. The measured data is a combination of different wavelengths. A reverse Hadamard transform may then be applied to the measured data to retrieve the spectrum associated with the sample.

Before describing the process in detail, consider that a Hadamard matrix is a square matrix whose entries are +1 or −1 and whose rows are mutually orthogonal. Geometrically, this means that every two different rows of a Hadamard matrix represent two perpendicular vectors. Combinatorially, this means that every two different rows have matching entries in exactly half of their columns and mismatched entries in the remaining columns. The corresponding properties are applicable to the columns as well as the rows.

For a given Hadamard matrix, sampling may occur either by stepping through each column or each word. In a first step 31, actuation of the MEMS mirror array 21 according to the desired Hadamard encoding is performed. Note that, in this embodiment, a "1" represents a transmissive pixel and "−1" represents a blocked pixel. In a second step 32, collection of pixel data according to the desired Hadamard word/encoding is performed. The first step 31 and the second step 32 are repeated until all desired Hadamard encodings have been measured. In a third step 33, the combined measurements are transformed according to a reverse Hadamard transform and result in a spectral signature. The spectral signature may include, for example, a Raman spectrum which is indicative of the sample being tested with the spectrometer.

Various embodiments of the Hadamard algorithm may be used. Since generally many mirror pixels are illuminated by a single wavelength, the mirror array pixels may be grouped into wavelength pixels. One wavelength pixel can contain as few as one mirror pixel, a 1×N grouping of mirror pixels, or a grouping of M×N mirror pixels, where M and N are positive integers. An electronic interface can perform the grouping of mirror pixels into wavelength pixels. This has the advantage of reducing the size of the Hadamard matrix to be used. The wavelength pixels may generally be defined so as to represent a monotonically increasing series of wavelengths, such that a one-dimensional Hadamard algorithm can be applied.

Generally, as used herein, an "echelle grating" includes a number of slits with widths close to the wavelength of the diffracted light. Accordingly, light of a single wavelength in a standard grating at normal incidence is diffracted to the central zero order and successive higher orders at specific angles, defined by the grating density/wavelength ratio and the selected order. Angular spacing between higher orders monotonically decreases and higher orders can get very close to each other, while lower ones are well separated. The intensity of the diffraction pattern can be altered by tilting the grating. Especially with reflective gratings (where the holes are replaced by a highly reflective surface), the reflective portion may be tilted (blazed) to scatter a majority of the light into the preferred direction of interest (specific diffraction order). For multiple wavelengths the same is true. However, it is possible that longer wavelengths of a higher order might overlap with the next order(s) of a shorter wavelength, which usually is an unwanted side effect.

In echelle gratings, however, this behavior is deliberately used and the blaze is optimized for multiple overlapping higher orders. Since this overlap is not directly useful, a second, perpendicularly mounted dispersive element (grating or prism or combination of both) may be inserted as an "order separator" or "cross disperser" into the beam path. Hence, the spectrum consists of stripes with different, but slightly overlapping, wavelength ranges that run across an imaging plane in an oblique pattern.

When a cross-dispersing prism is used, the order spacing varies as described. However, when a cross-dispersing grating is used, the spacing varies in the reverse way with the lower orders closer together. When a combination of grating and prism is used, the spacing can be optimized such that the minimum spacing is closer to the maximum spacing.

It should be recognized that the teachings herein are merely illustrative and are not limiting of the invention. Further, one skilled in the art will recognize that additional components, configurations, arrangements and the like may be realized while remaining within the scope of this invention. Generally, design and/or application of components of the spectrometer is limited only by the needs of a system designer, manufacturer, operator and/or user and demands presented in any particular situation. For example, although embodiments disclosed herein include a second mirror (mirror B), and a second echelle grating (grating B), additional mirrors and gratings may be used as deemed appropriate. Accordingly, at least one of the second mirror and the second echelle grating may be referred to in a non-limiting fashion, such as "another mirror" and "another echelle grating" (respectively).

As a matter of convention, aspects of some of the terminology used herein are now presented for a matter of convenience. It should be understood that the following descriptions are not limiting of the terminology.

As discussed herein, "identifying", "identifying the presence", "evaluating the presence", "analyze", or similar terms, includes either or both a qualitative evaluation (for example, the substance is or is not present) as well as a quantitative evaluate (that is, how much is present). "May" means optionally. For example, if any embodiment of the invention "may have feature X" then that embodiment can actually include feature X or not include feature X. "Or" in this application references that either one, or both. For example, if "A, B, or C" can be used, this means any one of them or any combination of two or more of them, can be used. A "processor" as used herein may be any hardware or hardware/software combination which is capable of carrying out the steps require of it. For example, a processor may be a suitably programmed microprocessor or application specific integrated circuit. For example, a processor could include a suitably programmed general purpose microprocessor, or an application specific integrated circuit ("ASIC"). In the case where the processor is programmable, it may not yet be programmed but only capable of being loaded with the program required so the processor can then accomplish the tasks required. "Light" reference any electromagnetic radiation in the wavelength range of 10 nanometers to 1 meter, and can includes ranges generally recognized as ultraviolet (10 to 400nm), visible (400-700nm), near infrared and infrared (700 nm-15 µm), and far infrared (15-1000 µm) and microwave (1 mm-1 m) ranges. "Path length" refers to the length of a path the light takes from one feature to another, for example the path length of the beam from the entry port to its first reflection on the inner reflective surface, or the total path length of the beam from the entry to exit port. When a range of any quantity is mentioned, that range specifically describes and expressly includes every included whole unit value or next decimal place within that range (for example, at least 99% includes 99.0%, 99.1%, 99.2% and the like up to 100%).

It will be appreciated that any embodiment of the present invention may have features additional to those cited. Sometimes the term "at least" is used for emphasis in reference to a feature. However, it will be understood that even when "at least" is not used, additional numbers or type of the referenced feature may still be present. All references cited in the present application are fully incorporated herein by reference. However, where anything in any incorporated reference contradicts anything stated in the present application, the present application prevails. The order of any sequence of events in any method recited in the present application, is not limited to the order recited. Instead, the events may occur in any order, including simultaneously, which is logically possible. Any spectrometer of the present invention may be hand-held. By "hand-held" in this context is referenced a spectrometer instrument which weighs less than 10 kg, and more typically less than 5, 2, 1, or even less than 0.5 or 0.2 kg, and may have dimensions of less than 50cm or 30cm in each dimension, and one of the dimensions (the thickness) may even be less than 10 cm or 5 or 3 cm. A "hand-held" spectrometer will often be battery powered with the battery typically fitting within the foregoing dimensions and included in the foregoing weights, although a separate power supply could be provided and connected to the spectrometer (for example, through a USB or other cable).

Various other components may be included and called upon for providing for aspects of the teachings herein. For example, additional materials, combinations of materials and/or omission of materials may be used to provide for added embodiments that are within the scope of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

In the present application a variety of variables are described, including but not limited to components, conditions, and performance characteristics. It is to be understood that any combination of any of these variables can define an embodiment of the invention. For example, a combination of a particular set of components (such as at least one grating, optical device and the like), under a particular range of operational conditions, but the specific combination might not be expressly stated, is an embodiment of the invention. Other combinations of articles, components, conditions, and/or methods can also be specifically selected from among variables listed herein to define other embodiments, as would be apparent to those of ordinary skill in the art.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A spectrometer comprising: a collimating element configured for collimating a beam of light into a first one of a set of elements comprising a cross-dispersing element and an echelle grating, the echelle grating in optical communication with the cross-dispersing element; the first element of the set configured for directing the light to the other element of the set; a focusing element for receiving the light from the other element and focusing wavelengths of the light onto a spatial light modulator; and at least one optical filter configured to one of pass and reflect a particular group of wavelengths; the spatial light modulator configured for selectively directing the wavelengths onto a detector for detection.

2. The spectrometer as in claim 1, wherein the collimating element comprises at least one of a lens, a Fresnel lens, a mirror and a diffractive element.

3. The spectrometer as in claim 1, wherein the focusing element comprises at least one of a lens and a mirror.

4. The spectrometer as in claim 1, further comprising at least another dispersing element for directing the light into the detector.

5. The spectrometer as in claim 1, wherein the spatial light modulator is configured to direct the wavelengths back through the cross-dispersing element and the echelle grating to the detector.

6. The spectrometer as in claim 1, further comprising at least one of: a data interface, a user interface, a power supply, a source of illumination, a power management controller, a logic controller, a processor, memory, energy storage, and software.

7. The spectrometer as in claim 1, further comprising at least one user adjustable mechanism.

8. The spectrometer as in claim 7, where in the user adjustable mechanism comprises an adjustable slit.

9. The spectrometer as in claim 1, wherein the spectrometer exhibits a detection range of about 900 nm to about 2500 nm, with a pixel resolution of about 0.5 nm.

10. A method for performing spectral analysis of a sample, the method comprising: selecting a spectrometer that comprises a collimating element configured for collimating a beam of light into a first one of a set of elements comprising a cross-dispersing element and an echelle grating, the echelle grating in optical communication with the cross-dispersing element; the first element of the set configured for directing the light to the other element in the set; a focusing element for receiving the light from the other element and focusing wavelengths of the light onto a spatial light modulator; and at least one optical filter configured to one of pass and reflect a particular group of wavelengths; the spatial light modulator configured for selectively directing the wavelengths onto a detector for detection; detecting light from a sample with the spectrometer; and analyzing the light to provide the spectral analysis.

11. The method as in claim 10, further comprising illuminating the sample with a light source.

12. The method as in claim 10, further comprising reflecting wavelengths from the spatial light modulator with at least one of another mirror and lens.

13. The method as in claim 10, further comprising dispersing reflected wavelengths with at least one of another echelle grating and a dispersing element.

14. The method as in claim 10, further comprising filtering a group of wavelengths into the detector.

15. The method as in claim 10, further comprising at least one of performing the spectral analysis with the spectrometer and performing spectral analysis remotely.

16. The method as in claim 10, further comprising iteratively combining wavelength data according to a Hadamard transform.

17. The method as in claim 16, further comprising applying a Hadamard transform to the combined wavelength data.

18. A method for fabricating a spectrometer, the method comprising: configuring a collimating element to collimate a beam of light into a first one of a set of elements comprising a cross-dispersing element and an echelle grating, the echelle grating in optical communication with the cross-dispersing element, the first element of the set configured for directing the light to the other element in the set; configuring a focusing element to focus wavelengths of light from the other element onto a spatial light modulator, the spatial light modulator directing the wavelengths onto a detector for detection; configuring at least one optical filter to one of pass and reflect a particular group of wavelengths; and arranging the detector to receive the wavelengths.

19. The method as in claim 18, further comprising assembling the components in a housing suited for providing the spectrometer as a hand-held spectrometer.

20. A spectrometer comprising: a collimating element configured for collimating a beam of light into a first one of a set of elements comprising a cross-dispersing element and an echelle grating, the echelle grating in optical communication with the cross-dispersing element, the first element of the set configured for directing the light to the other element in the set; a focusing element for receiving the light from the other element and focusing wavelengths of the light onto a spatial light modulator; the spatial light modulator configured for selectively directing the wavelengths back through the cross-dispersing element and the echelle grating onto a detector for detection.

21. The spectrometer as in claim 20, wherein the collimating element comprises at least one of a lens, a Fresnel lens, a mirror and a diffractive element.

22. The spectrometer as in claim 20, wherein the focusing element comprises at least one of a lens and a minor.

23. The spectrometer as in claim 20, further comprising at least another dispersing element for directing the light into the detector.

24. The spectrometer as in claim 20, further comprising at least one of: a data interface, a user interface, a power supply, a source of illumination, a power management controller, a logic controller, a processor, memory, energy storage, and software.

25. The spectrometer as in claim 20, further comprising at least one user adjustable mechanism.

26. The spectrometer as in claim 25, where in the user adjustable mechanism comprises an adjustable slit.

27. The spectrometer as in claim 20, wherein the spectrometer exhibits a detection range of about 900 nm to about 2500 nm, with a pixel resolution of about 0.5 nm.

* * * * *

UNITED STATES PATENT AND TRADEMARK OFFICE
CERTIFICATE OF CORRECTION

| | | |
|---|---|---|
| PATENT NO. | : 8,922,769 B2 | Page 1 of 1 |
| APPLICATION NO. | : 13/796747 | |
| DATED | : December 30, 2014 | |
| INVENTOR(S) | : Malcolm C. Smith | |

It is certified that error appears in the above-identified patent and that said Letters Patent is hereby corrected as shown below:

In the claims,

Column 8, line 16, In claim 2, delete "minor" and insert therefor --mirror--.

Column 10, line 11, In claim 22, delete "minor" and insert therefor --mirror--.

Signed and Sealed this
Eighth Day of March, 2016

Michelle K. Lee
*Director of the United States Patent and Trademark Office*